United States Patent [19]
Arai et al.

[11] Patent Number: 5,978,922
[45] Date of Patent: *Nov. 2, 1999

[54] COMPUTER SYSTEM HAVING RESUME FUNCTION

[75] Inventors: Makoto Arai, Tokyo; Shigenobu Sato, Iruma; Hideaki Muraya, Tokyo; Keiichi Kato, Tokyo; Hiroyuki Tsukada, Tokyo, all of Japan

[73] Assignee: Kabushiki Kaisha Toshiba, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/714,410

[22] Filed: Sep. 16, 1996

[30] Foreign Application Priority Data

Feb. 29, 1996 [JP] Japan ................................ 8-042911

[51] Int. Cl.⁶ ...................................................... G06F 1/32
[52] U.S. Cl. .............................. 713/323; 713/340; 714/15
[58] Field of Search .......................... 395/750.05, 750.08, 395/182.22, 182.13; 713/323, 340; 714/24, 15

[56] References Cited

U.S. PATENT DOCUMENTS

| | | | |
|---|---|---|---|
| 4,611,289 | 9/1986 | Coppola | 364/492 |
| 4,907,150 | 3/1990 | Arroyo et al. | 395/750.05 |
| 5,218,607 | 6/1993 | Saito et al. | 371/66 |
| 5,379,435 | 1/1995 | Hanaoka . | |
| 5,435,005 | 7/1995 | Saito . | |
| 5,471,624 | 11/1995 | Enoki et al. | 395/750 |
| 5,530,877 | 6/1996 | Hanaoka . | |
| 5,586,334 | 12/1996 | Miyazaki et al. | 395/750.01 |
| 5,617,532 | 4/1997 | Ushiyama | 395/182.12 |
| 5,710,931 | 1/1998 | Nakamura et al. | 395/750.08 |
| 5,822,600 | 10/1998 | Hallowell et al. | 714/24 |

FOREIGN PATENT DOCUMENTS

| | | |
|---|---|---|
| 0 636 983 A1 | 2/1995 | European Pat. Off. . |
| 0 658 843A1 | 6/1995 | European Pat. Off. . |
| 43 09 532 | 9/1993 | Germany . |
| 43 09 149 C | 6/1994 | Germany . |
| 2-69812 | 3/1990 | Japan . |
| 4-023019 | 1/1992 | Japan ................... G06F 1/00 |
| 4-23019 | 1/1992 | Japan . |
| 5-94237 | 4/1993 | Japan . |
| 5-241674 | 9/1993 | Japan . |
| 5-25031 | 9/1993 | Japan . |
| 6-028267 | 2/1994 | Japan ................. G06F 12/16 |
| 6-28267 | 2/1994 | Japan . |
| 6 -124148 | 5/1994 | Japan . |
| 6-124148 | 5/1994 | Japan . |
| 6-138987 | 5/1994 | Japan . |
| 6 -168081 | 6/1994 | Japan . |
| 6-161590 | 6/1994 | Japan . |
| 6-175746 | 6/1994 | Japan . |
| 7-84848 | 3/1995 | Japan . |
| 7-160598 | 6/1995 | Japan . |
| 7-295671 | 11/1995 | Japan . |
| WO 91 07796 | 5/1991 | WIPO . |

*Primary Examiner*—Glenn A. Auve
*Attorney, Agent, or Firm*—Limbach & Limbach LLP

[57] ABSTRACT

A computer system having a hibernation-type resume function which is performed by using an HDD. Provided on the hard disk of the HDD are storage area for storing ordinary data. Also provided on the hard disk is a resume storage area which is large enough to save resume data required to perform a resume operation. The resume storage area is controlled by a BIOS provided for performing the resume operation, not by the operating system (OS) of the computer system. The BIOS accesses the resume storage area when the power supply to the system is switched off, thereby saving the resume data in a resume data memory.

40 Claims, 12 Drawing Sheets

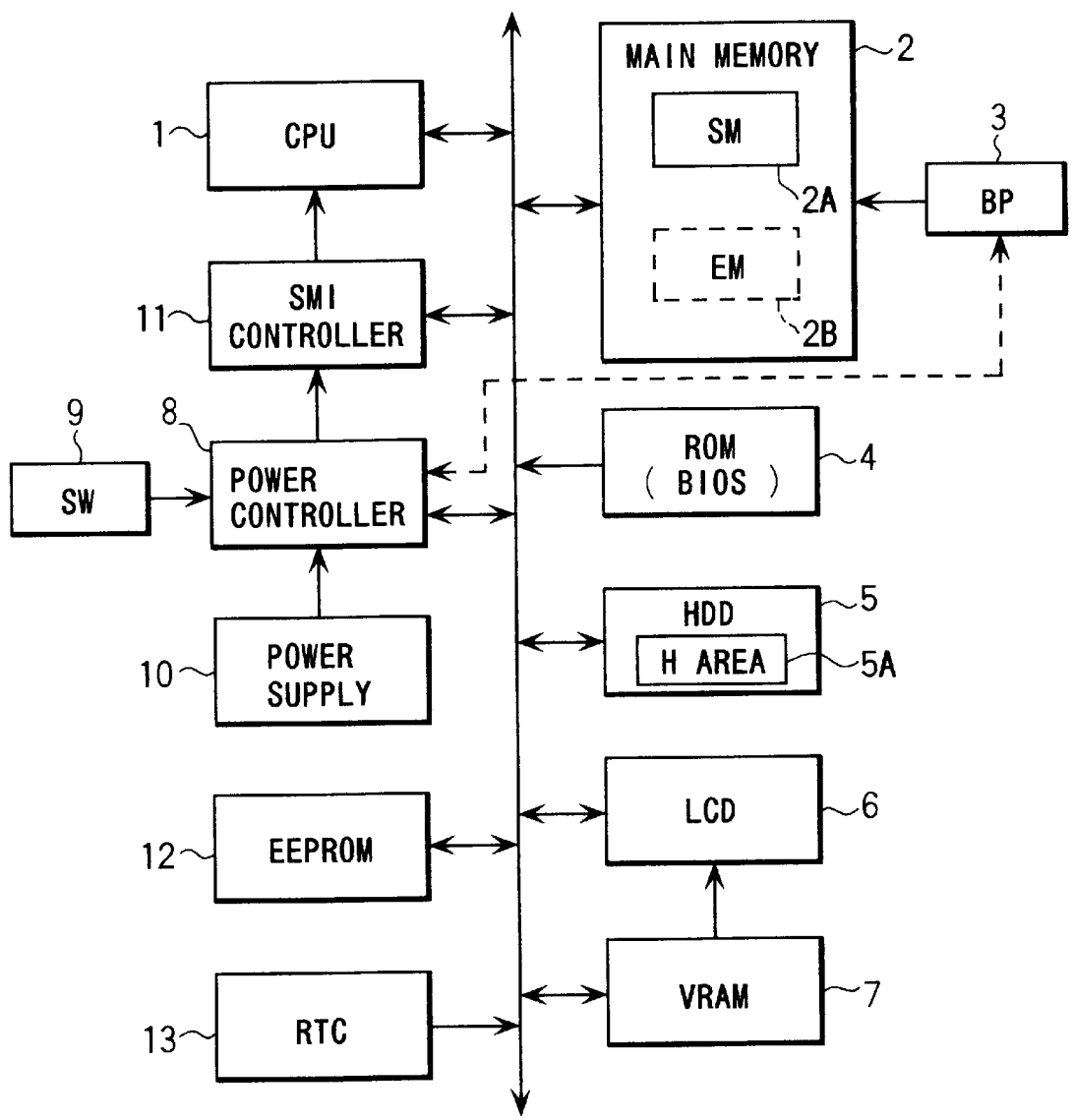
F I G. 1

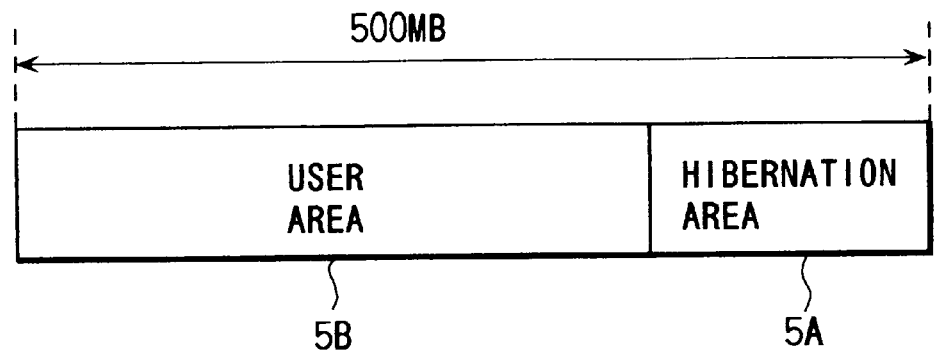
F I G. 2 A
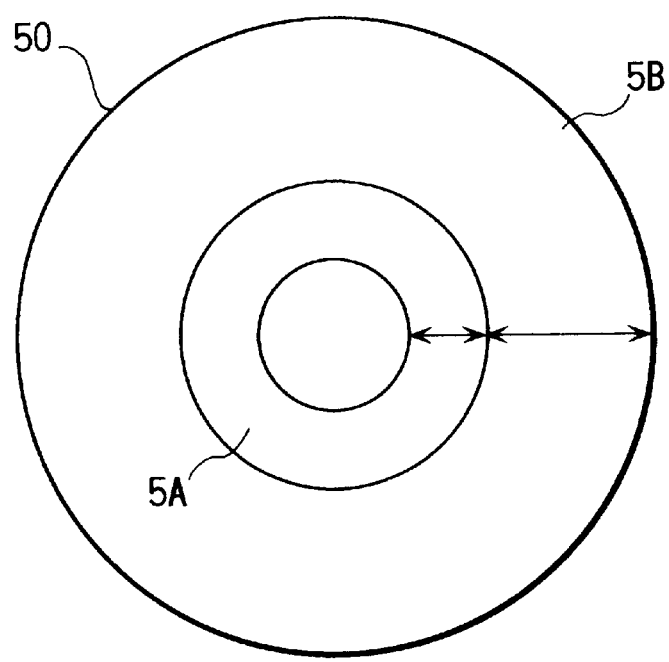
F I G. 2 B

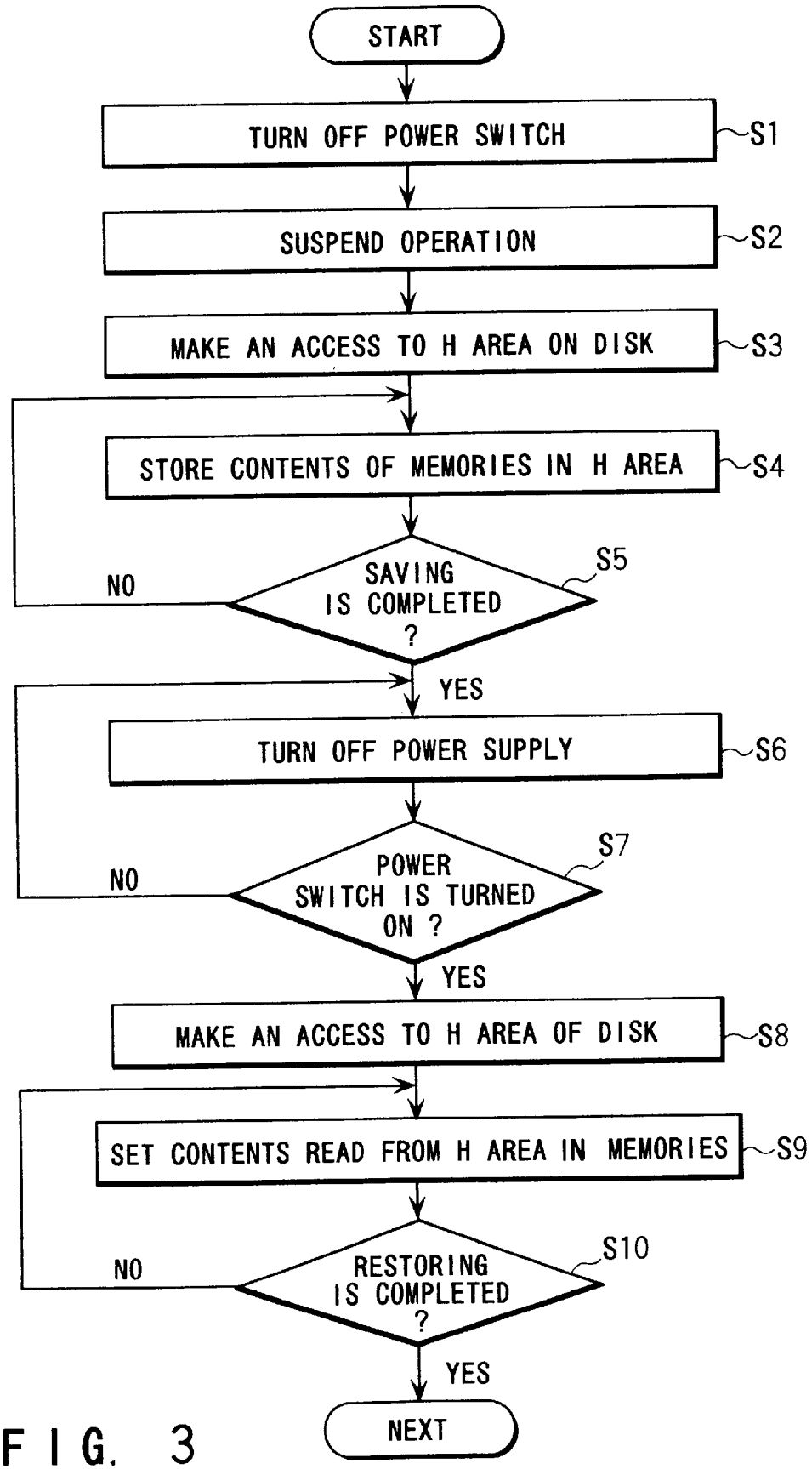
F I G. 3

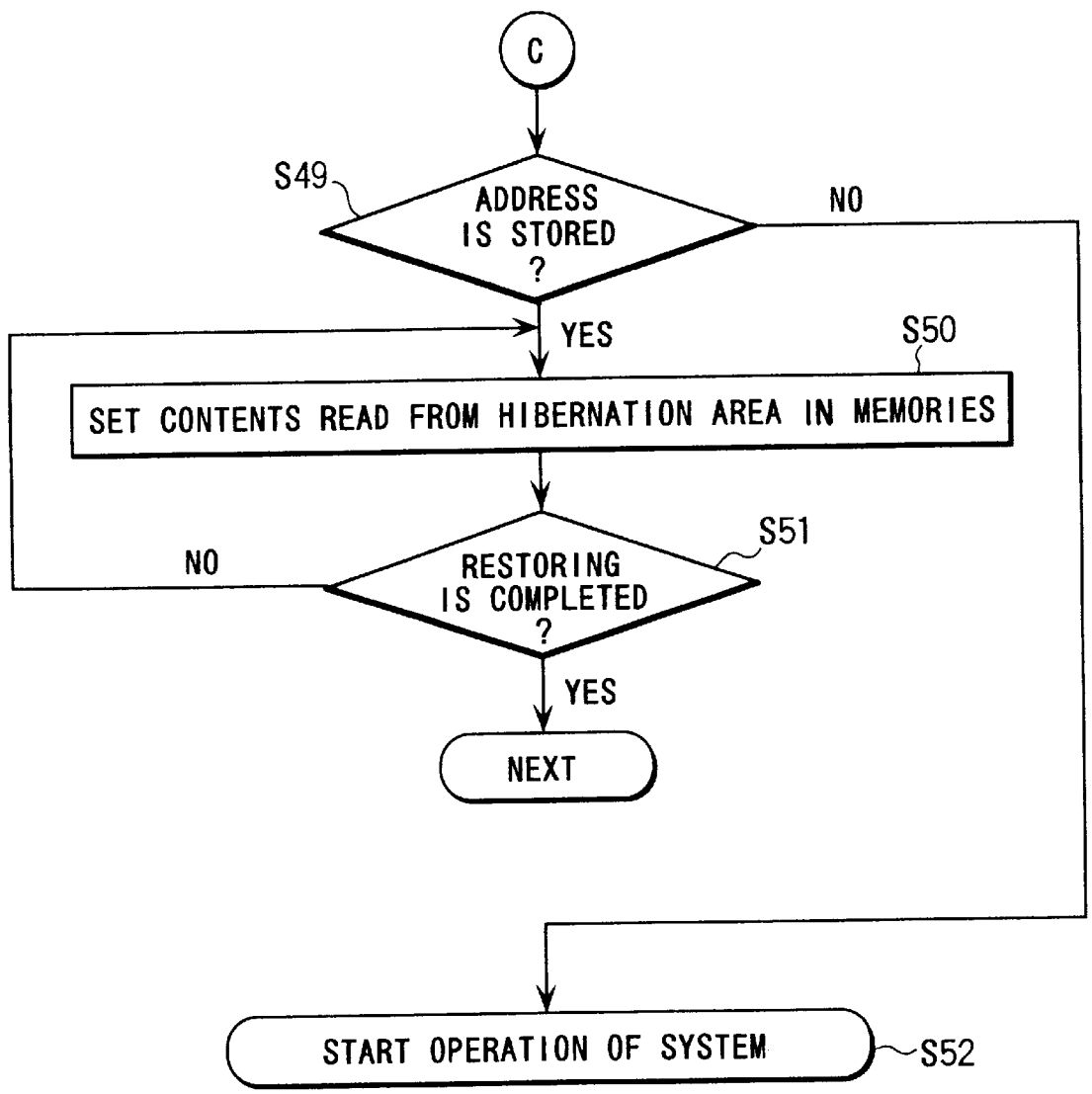
F I G. 7B

COMPUTER SYSTEM HAVING RESUME FUNCTION

BACKGROUND OF THE INVENTION

1. Field of the Invention

The present invention relates to a computer, such as a personal computer, which has resume function of hibernation type.

2. Description of the Related Art

Battery-driven, portable personal computers have resume function. When a personal computer of this type is switched off, or more precisely when its power switch is turned off, the data items representing the conditions the display panel, the computer and the application program assume immediately before the power switch is turned off are saved in a memory which is driven by the battery. When the power switch is turned on, the display panel, the computer and the application program resumes the conditions represented by the data items saved in the battery-driven memory. Thus, the personal computer can be operated again in exactly the same conditions it assumed when the power switch was turned off. Saving these data items in the memory when the computer is turned off is known as "suspend operation." Thanks to the resume function, the information and the status data respectively stored in the main memory and the CPU internal resister can be saved when the power switch is turned off and can be restored when the power switch is turned on.

The backup power supply for the memory required to achieve the resume function is a rechargeable battery one or an auxiliary dry cell. If the power remaining in the chargeable battery or auxiliary dry cell is not enough to complete the resume function, the data items to be saved in the memory will be erased when the resume function is performed.

To prevent such erasure of data items, new type of resume function called "hibernation" has been developed. Hibernation-type resume function saves the data items the computer requires to resume its operating conditions, on the hard disk incorporated in the hard disk drive (HDD) of the personal computer. The hibernation-type resume function can be performed with no backup power supply for a memory. Hence, the power supply to the computer is completely stopped when the power switch is turned off.

Portable computers recently developed and known as "notebook type" incorporate a small, large-capacity HDD. A notebook-type portable computer is provided with hibernation-type resume function, so that the data items representing the operating conditions of the computer and application program may be saved on the hard disk incorporated in the HDD. The HDD requires no backup power supply, because it is a nonvolatile memory. The HDD stores data almost eternally after the power supply to the computer is completely stopped.

Therefore, it can serve to accomplish a reliable resume function.

A computer having hibernation-type resume function has some problems, as will be explained below.

First, for the following reason, the computer may fail to resume the last operating conditions when it is switched on again. A great amount of data is stored exclusively in the HDD, unlike in a computer having normal-type resume function achieved by the use of a memory and a backup battery. In some cases, the HDD which is designed as an external memory device for storing a large amount of data may have no empty storage areas or insufficient empty storage areas when it is necessary to perform the resume function. Assume that the computer is turned off in this condition, whereby the resume function is performed. Then, the data items representing the operating conditions of the computer cannot be saved in the HDD, disabling the computer to resume the operating conditions when it is turned on again.

Since the HDD is controlled on the basis of the file-control scheme of the operating system (OS) installed in the computer (e.g., the FAT control of MS-DOS), the storage area of the HDD, provided for the resume function, is controlled as a resume-function file. Hence, the resume function cannot work if set by any other operating system.

Second, since the access speed of the HDD is lower than that of an IC memory or the like, some time is required to write the data items stored in the main memory, onto the hard disk when the computer is turned off, and to read the data items from the hard disk when the computer is turned on. A considerably long time inevitably lapses until the data items saved on the hard disk is written back into the main memory, particularly when the power switch is turned on immediately after it is turned off to write the contents of the main memory onto the hard disk by virtue of the resume (suspend) operation. Hence, if the hibernation-type resume function is applied to a portable personal computer (e.g., a notebook-type computer), it will impair the operability of the portable personal computer.

Third, the data items stored in the HDD by the resume operation will be erased if the HDD is detachable one and removed from the personal computer to be replaced with an HDD having a larger storage capacity. If the HDD is set in the computer of another user, the data items saved in the HDD can be accessed by the other user. Here arises a so-called security problem.

Fourth, hibernation-type resume operation consumes far more power than normal-type resume operation. This is because much power is required to drive the HDD in the hibernation-type resume operation, whereas a small amount of power is sufficient to save the data items in a battery-driven memory in the normal-type resume operation. The battery loaded in a portable personal computer has but a small capacity. The amount of power it accumulates by a single recharging is much limited. The power remaining in the battery may not be sufficient to drive the HDD when the computer is turned off. In this case, the data items which the computer needs to resume its last operating conditions cannot be saved in the HDD. In other words, the hibernation-type resume function cannot work at all.

Fifth, the data items cannot be saved on the hard disk, making it possible to carry out the hibernation-type resume operation, when the discontinuous empty storage areas found on the hard disk fail to provide a storage area large enough to store the data items. Even if the discontinuous empty storage areas constitute a sufficient storage area, it takes much time to access all these empty storage areas, inevitably lengthening the time for performing the hibernation-type resume function. In this regards, it should be noted that the storage areas on the hard disk, allocated to the hibernation-type resume function, are controlled by, for example, FAT (File Allocation Table) scheme.

SUMMARY OF THE INVENTION

A first object of the present invention is to provide a computer system in which a storage area is provided in an HDD and a hibernation-type resume function works, whichever type is the file-control scheme of the OS installed in the computer system.

A second object of the invention is to provide a computer system which can fast restore the data required to resume the last operating conditions, within a short time after the system is switched on.

A third object of this invention is to provide a computer system which can reliably protect the data saved in an HDD by a resume function, even after the HDD is removed from the system.

A fourth object of the invention is to provide a computer system which incorporates a battery of a relatively small capacity and which can yet perform a reliable resume function whenever necessary.

A fifth object of the present invention is to provide a computer system has an HDD having a storage area for saving data by a resume function, and can access that storage area at high speed.

According to a first aspect of the invention, there is provided a computer system which has resume means and in which a storage area is permanently provided on a hard disk set in an HDD, for saving data by a resume function. The storage area is distinguished from the other storage areas which are provided on the hard disk to store user data and the like. It is free from the file-control scheme of the OS used and is accessed by the resume means.

According to a second aspect of the invention, there is provided a computer system which has standby means for keep supplying power to the system for a designated time after the power switch of the system is turned off. Hence, data in the main memory can be saved in an HDD for some time after the power switch is turned off. Data is read from a memory driven by a backup battery when the power switch is turned on within the designated period of time after the power switch is turned off. Thus, the last operating conditions of the computer system can be resumed within a short time after the system is switched on, without the necessity of accessing the HDD immediately after the system is switched off.

According to a third aspect of the invention, there is provided a computer system which comprises a HDD, storage-area defining means, a main memory, and nonvolatile memory. The HDD incorporating a hard disk can be replaced with another. The storage-area defining means is designed to define a storage area on the hard disk, in which data can be saved by a resume function. The storage area is defined in accordance with, for example, the time at which the contents of the main memory are to be written into the HDD. The nonvolatile memory stores an address designating the storage area. When the computer system is switched on, the address is read from the nonvolatile memory. In accordance with the address, the storage-area defining means defines a storage area on the hard disk. The contents of the main memory are saved in the storage area this defined. Hence, if the HDD is removed from the computer system and incorporated into another computer system, the data saved in the storage area on the hard disk is protected since the address designating the storage area is not available in the other computer system.

According to a fourth aspect of the invention, there is provided a computer system which incorporates a battery. In the computer system, the amount of power remaining in the battery and the rate at which the system consumes power are calculated. A minimal amount power which should remain in the battery to perform a resume function is estimated from the amount of remaining power and the power-consumption rate. The minimal amount of power is compared with the amount of power remaining in the battery. When the power in the battery decreases to the minimal amount, the resume function is automatically performed.

According to a fifth aspect of this invention, there is provided a computer system which comprises a main memory and an HDD. The storage capacity of the main memory is detected when the computer system is activated. On the hard disk of the HDD, continuous storage areas the total storage capacity of which is equal to the detected storage capacity of the main memory, for saving data items by a resume function. Needless to say, other storage areas are provided on the hard disk, for storing user data or the like. Since the storage area for saving data items by the resume function are continuous (e.g., storage areas in the consecutive tracks), they can be accessed at high speed when the computer system is switched on.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of a computer system according to a first embodiment of the invention;

FIGS. 2A and 2B are diagrams explaining a method defining a hibernation area on a hard disk in the computer system shown in FIG. 1;

FIG. 3 is a flow chart explaining how a hibernation-type resume operation is performed in the computer system shown in FIG. 1;

FIGS. 7A and 7B are flow charts explaining a hibernation-type resume operation is performed in the computer system according to the third embodiment;

DETAILED DESCRIPTION OF THE PREFERRED EMBODIMENTS

Figure 4:
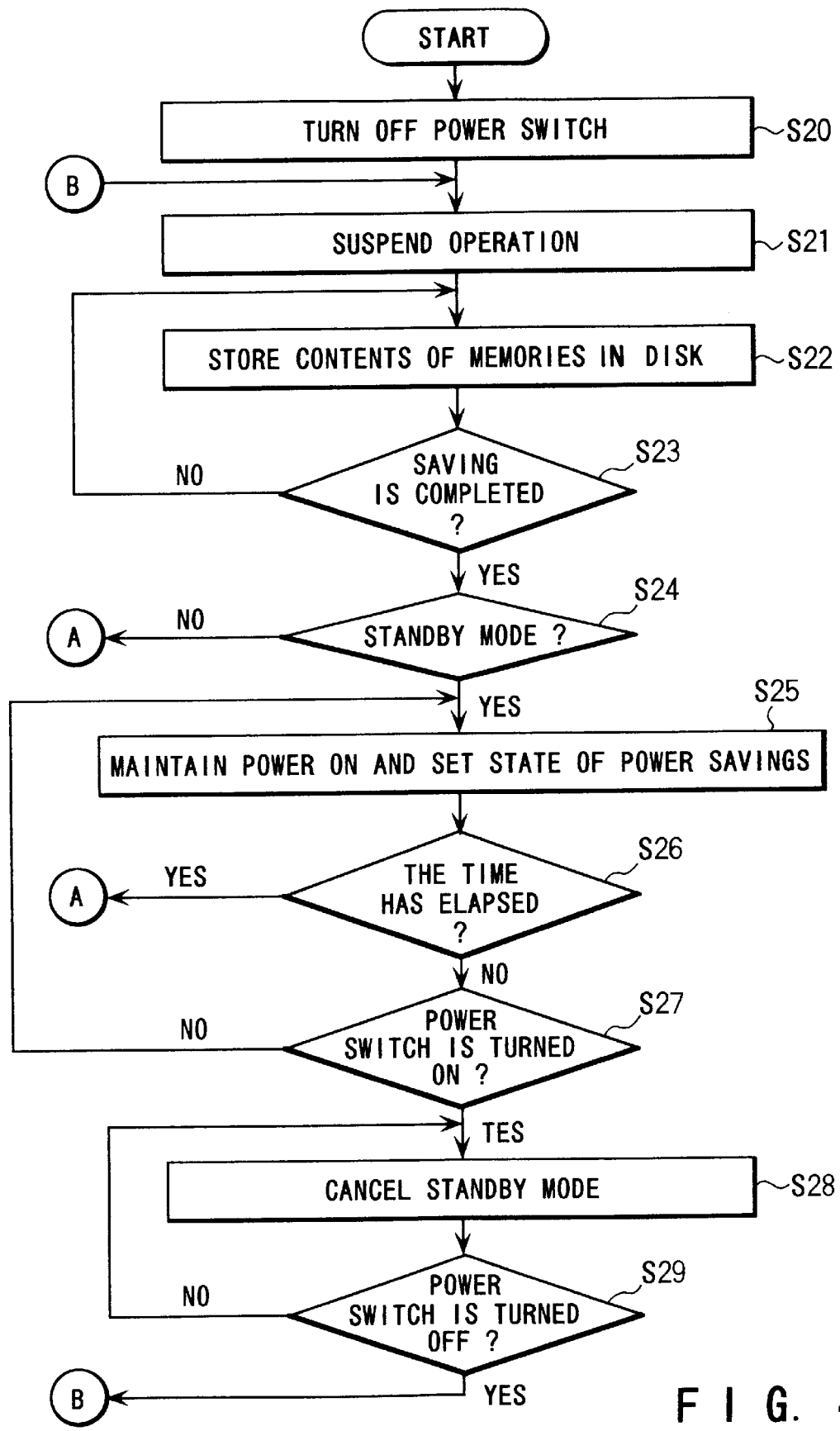
FIG. 4 is the first part of a flow chart explaining how a hibernation-type resume operation is performed in a computer system according to a second embodiment of the invention.

Embodiments of the present invention will now be descried, with reference to the accompanying drawings.

Structure of the System

The computer system according to the invention is a portable personal computer such as a notebook-type computer. As shown in FIG. 1, it comprises a power supply 10 and an external memory 5. The power supply 10 is a rechargeable buttery, and the external memory 5 is a hard disk drive (HDD).

The computer system further comprises a CPU (Central Processing Unit) 1, a main memory (DRAM) 2, a backup power-supply circuit (BS) 3, a ROM (Read-Only Memory) 4, a display (LCD) 6, a VRAM (video RAM) 7, a power-supply controller (microcomputer) 8, a power switch 9, an SMI (System Management Interrupt) controller 11, a nonvolatile memory (EEPROM) 12, and a real-time counter (RTC) 13. The ROM 4 stores BIOS (Basic Input/Output System). The main memory 2 has an SM area 2A, i.e., a work memory area for storing the BIOS exclusively. If the computer system incorporates an expansion memory, the main memory 2 will have an expansion memory area 2B. The VRAM 7 is provided to store data which the display 6 is to display.

The BIOS 4 is basic software which impart a hibernation-type resume function and a normal-type resume function to the computer system; it executes the boot mode of the computer system. The power-supply controller 8 monitors the on/off operation of the power switch 9 and switches the power supply 10 on and off. The controller 8 monitors the amount of power remaining in the power supply 10 (i.e., the rechargeable battery), as will be described later. The backup power-supply circuit 3 supplies backup power to the main memory 2 under the control of the power-supply controller 8.

The SMI (System Management Interrupt) controller 11 is an interruption controller for executing an SM interruption to the CPU 1. In standby mode, for example, the controller 11 executes an SM interruption (SMI) in response to a signal which is supplied from the power-supply controller 8 and which indicates that the power switch 9 is turned on. The nonvolatile memory 12 is an EEPROM incorporated in the housing of the computer system. The memory 12 stores an address designating a storage area 5A for hibernation-type resume operation (see FIG. 6B). (The storage area 5A may be used as an H area in some cases.)

The power supply 10 is switched on and off not only when the power switch 9 is turned on and off, but also when the display panel of the display 6 is opened and closed. Furthermore, the power supply 10 is switched off when the computer system is automatically switched off. For brevity, it is assumed here that the power supply 10 is switched on and off only when the power switch 9 is operated.

First Embodiment

The first embodiment of the invention is a computer system in which storage area 5A for hibernation-type resume operation (H area) 5A is permanently provided on the hard disk of the HDD 5 as shown in FIG. 2A. To be more specific, the HDD 5 has a storage capacity of 500 MB (megabytes), and the H area 5A is a continuous storage area in which 22 MB of data can be stored.

When the hibernation-type resume function is performed, all data stored in the main memory 2 and all data stored in the VRAM 7 are saved in the H area 5A before the computer system is switched off. Assume that the main memory 2 and the VRAM 7 have a storage capacity of 20 MB (a standard 8 MB-memory and an extended 12 MB-memory) and a storage capacity of 1 MB, respectively, and that a 1-MB auxiliary memory is provided to compensate for a defect which may occur in the main memory 2 and the VRAM 7. As shown in FIG. 2B, the H area 5A consists of consecutive inner tracks formed on the hard disk 50.

The HDD 5 has a user area 5B. The user area 5B is controlled by the OS (Operating System) installed in the computer system. For example, the user area 5B is controlled by FAT (File Allocation Table) scheme. On the other hand, the H area 5A is controlled by the BIOS 4. The OS cannot use the H area 5A at all. Thus, even if the OS is changed to another, the BIOS 4 accesses the H area 5A. The data stored in the main memory 2 and VRAM 7 can thereby be saved in the H area 5A and then read from the H area 5A back into the main memory 2 and the VRAM 7 or restored, provided that the resume conditions are satisfied. This is hibernation-type resume operation.

How the hibernation-type resume operation is effected in the first embodiment will be explained, with reference to the flow chart of FIG. 3.

First, the power switch 9 is turned on, and the power-supply controller 8 supplies power from the power supply 10 to the other components of the computer system. In other words, the computer system is activated. (More precisely, the CPU 1 starts processing data and controlling the other components of the computer system.)

When the user turns off the power switch 9 (Step S1), the BIOS 4 starts performing a suspend operation in response to an SMI signal supplied from the power-supply controller 8 (Step S2). The contents of the internal register of the CPU 1 and the other hardware registers are saved in the SM-RAM 2A of the main memory 2 which is still driven by the power supply 10 (battery). The H area 5A of the HDD 5 is accessed (Step S3). The data stored in the main memory 2 and VRAM 7 is thereby saved in the H area 5A (Step S4).

It is determined whether the data stored in the main memory 2 and VRAM 7 is completely saved in the H area 5A (Step S5). If the data is completely saved in the H area 5A, the power-supply controller 8 stops the power supply from the power supply 10 (battery) in response to an instruction which the BIOS 4 issues (Step S6). As a result, the computer system is set into non-operating state; the display 6 and the HDD 5 stop operating. At this time, the data the system requires to resume its last operating conditions is stored in the H area 5A of the HDD 5.

It is then determined whether the user turns on the power switch 9 thereafter (Step S7). If Yes, the power-supply controller 8 supplies an SMI signal to the BIOS 4. In response to the SMI signal the BIOS 4 starts performing a resume operation. More specifically, the BIOS 4 accesses the H area 5A of the HDD 5, reading all data saved in the H area 5A (Step S8). The BIOS 4 writes the data back into the main memory 2 and the VRAM 7 (Steps S9 and S10), thus restoring the data. The computer system therefore resumes the operating conditions it assumed immediately before it was switched off. Thus, the display 6 displays the data which was stored in the VRAM 7 immediately before the system was switched off. The CPU 1 processes data in accordance with the status data which was stored in the internal register when immediately before the system was switched off.

Second Embodiment

The second embodiment of the invention is a computer system which perform a hibernation-type resume operation in which the system is set into a standby mode when it is switched on and remains in the standby mode until it is switched off. In the standby mode, the backup power-supply circuit 3 remains on for a specified period after the power switch 9 is turned off. During this time the normal-type resume operation and the hibernation-type resume operation are performed in parallel during the specified period. The specified period is input by selecting a value for the period, on the set-up screen of the display 6.

Figure 5:
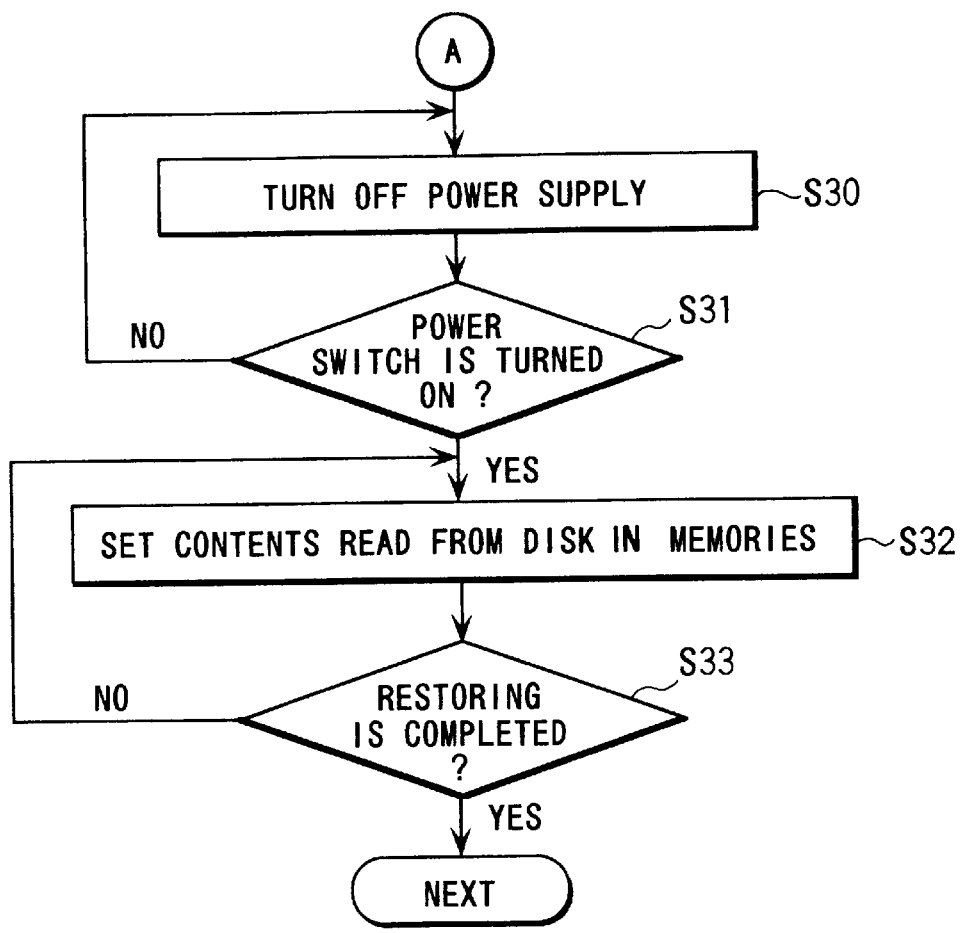
FIG. 5 is the second part of the flow chart explaining how a hibernation-type resume operation is performed in a computer system according to a second embodiment.

How the hibernation-type resume operation is effected in the standby mode in the second embodiment will be explained, with reference to the flow chart of FIGS. 4 and 5.

First, the power switch 9 is turned on, and the power-supply controller 8 supplies power from the power supply 10 to the other components of the computer system. Thus the computer system is activated.

When the user turns off the power switch 9 (Step S20), the BIOS 4 starts performing a suspend operation in response to an SMI signal supplied from the power-supply controller 8 (Step S21). The contents of the internal register of the CPU 1 and the other hardware registers are saved in the SM-RAM 2A of the main memory 2 which is still driven by the power supply 10. The data displayed immediately before the power switch 9 was turned off (i.e., the data stored in the VRAM 7) is also saved in the SM-RAM 2A. The display 6 can therefore display the data when an instant-on function is effected as will be explained later.

Then, the H area 5A of the HDD 5 is accessed, whereby the data stored in the main memory 2 and VRAM 7 is thereby saved in the H area 5A (Step S22). It is determined whether the data is completely saved in the H area 5A (Step S23). If No, the operation returns to Step S22. If Yes, it is determined whether the computer system is set in the standby mode (Step S24). If Yes in Step S24, the backup power-supply circuit 3 is maintained on and the system is maintained in non-operating state (power-saving state), for the specified period after the power switch 9 is turned off (Step S25). That is, a clock signal is no longer supplied to the CPU 1, and the display 6 and the HDD 5 remains not operating during the specified period. As indicated above, power is supplied to only the main memory 2 from the backup power-supply circuit 3 in the standby mode. The contents of the main memory 2 is therefore saved.

Next, it is determined whether or not the specified period has elapsed (Step S26). If No, it is determined whether the power switch 9 is turned on (Step S27). If Yes in Step S27, the standby mode is canceled by a command supplied from the power-supply controller 8 and indicating the switching on of the computer system (Step 28). More precisely, the standby mode is canceled by the interruption signal (i.e., SMI signal) which the SMI controller 11 generates when the user turns on the power switch 9. Then, it is determined whether or not the power switch 9 is turned off (Step S29). If Yes, the operation returns to Step S21. If No, the operation returns to Step S28.

If No in Step S24, that is, if the system is not set in the standby mode, the operation goes to Step S30. In Step S30, all power supplies of the computer system are turned off. If Yes in Step S26, that is, the specified period has elapsed, the operation goes to Step S30, in which all power supplies of the computer system are turned off.

If Yes in Step S27, that is, if the power switch 9 is turned on before the specified period elapses, the BIOS 4 cancels the standby mode in response to the command supplied from the power-supply controller 8 (Step S28). The computer system is thereby brought into operating state. That is, the BIOS 4 restore the data stored in the main memory 2, thereby setting the computer system into the same operating condition the system assumed before the power switch 9 was turned off. The data which the register of the display unit stored before the switch 9 was turned off is therefore read from the SM-RAM 2A and is displayed on the screen of the display 6. Thus, the computer system resumes the operating conditions within a short time when the power switch 9 is turned on. The function of enabling the system to resume the operating conditions will be referred to as "instant-on function" hereinafter.

Further, it is determined whether or not the power switch 9 is turned on after the system is automatically switched off upon lapse of the specified period (Step S31). If No, the operation returns to Step S30. If Yes, the BIOS 4 is activated in the same way as the power supply 10 is turned on in ordinary manner. The BIOS 4 performs a resume function in response to the SMI signal supplied from the power-supply controller 8 (Steps S32) To be more specific, BIOS 4 accesses the H areas 5A of the HDD 5, reads the data stored in the main memory 2 and VRAM 7 from the H area 5A and writes it back into the main memory 2 and the VRAM 7, thus restoring the data. The computer system thereby resumes the operating conditions it assumed immediately before the power switch 9 was turned off.

Then, it is determined whether or not the data has been restored (Step S33). If No, the operation returns to Step 32. If Yes, the hibernation-type resume operation completes.

In the second embodiment which has a hibernation resume function, the instant-on function is performed if the user turns on the power switch 9 within the short specified period before the power supply 10 is turned off. Thus, the computer system can quickly resume its last operating conditions since the contents of the main memory 2 are restored in the standby mode. In other words, this is possible because the data items representing the operating conditions are read form the main memory 2 which has a high access speed, not from the HDD 5 which has a relatively low access speed.

The power supply 10 remains on in the standby mode. Nonetheless, power is not wasted since the computer system is maintained in non-operating state, i.e., power-saving state. Should the contents of the main memory 2 be erased because of, for example, a power supply failure, the contents of the main memory 2 can be reliably restored. This is because the contents of the memory 2 have been saved in the HDD 5.

Third Embodiment

The third embodiment of the present invention is a computer system of the type shown in FIG. 1, in which the HDD 5 can be replaced with another HDD. The third embodiment performs a hibernation-type resume operation to protect the data saved in the H area 5A of the HDD 5, i.e., the contents of the main memory 2 and VRAM 7. To state it another way, the third embodiment is designed to solve data-security problems.

How the third embodiment performs the hibernation-type resume operation will be explained, with reference to FIGS. 6A and 6B and the flow chart of FIGS. 7A and 7B.

Figure 6A:
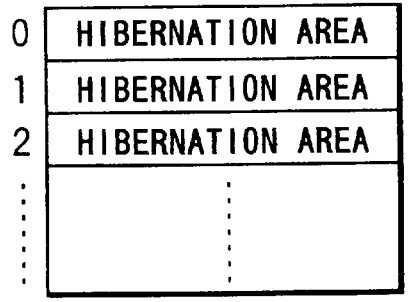
FIGS. 6A and 6B are diagrams explaining the basic concept of a computer system according to a third embodiment of the invention.
Figure 6B:
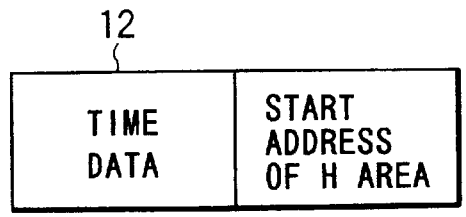
Figure 7A:
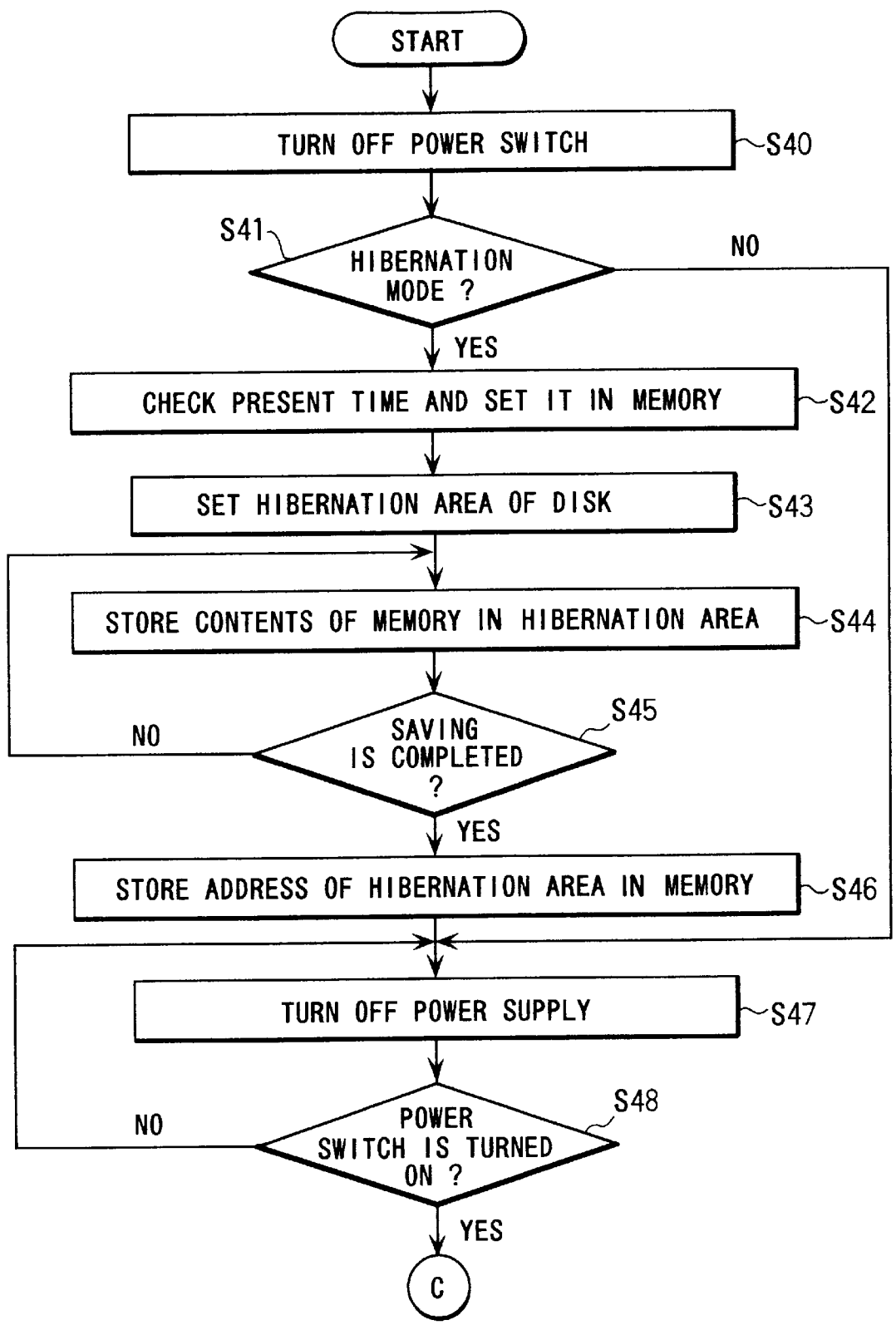

As seen from FIGS. 6A and 6B, a plurality of hibernation areas, or H areas, are provided on the hard disk of the HDD5. The H area are consecutive, assigned with consecutive logic addresses 0, 1, 2, . . . . The H areas are accessed in accordance with the address data stored in the nonvolatile memory (EEPROM) 12 incorporated in the computer system. The address data represents the first logic address 0 of the first H area provided on the hard disk. The address data is set when the data stored in the main memory 2 and VRAM 7 are to be saved in the HDD 5. The address data is ultimately altered every time the contents of the main memory 2 and VRAM 7 are actually saved in the H area 5A of the HDD 5.

First, the power switch 9 is turned on, and the power-supply controller 8 supplies power from the power supply 10 to the other components of the computer system. Thus the computer system is activated. When the user turns off the power switch 9 thereafter (Step S40), it is determined whether or not the computer system is set in the hibernation mode (Step S41). If Yes, the BIOS 4 starts performing a suspend operation in response to an SMI signal supplied from the power-supply controller 8. If No in Step S41, the operation goes to Step S47, in which the computer system is switched off.

If Yes in Step S41, the BIOS 4 generates data representing the present time measured by the real-time counter (RTC) 13 and writes the data into the nonvolatile memory (EEPROM) 12 (Step S42). Then, the BIOS 4 sets an hibernation (H area) 5A on the hard disk of the HDD 5 (Step S43). The BIOS 4 determines the first address of the H area 5A in which to save the data stored in the main memory 2 and VRAM 7, so that the data may be in the H area 5A. The BIOS 4 alters the first address (i.e., the cylinder address at which the data saving is started), every time the contents of the main memory 2 and VRAM 7 are written into the H area 5A. The first address is "0" when the first data item is written into the H area 5A. It is altered t "1" when the second data item is written into the H area 5A. The BIOS 4 saves the data stored in the main memory 2 and VRAM 7, at the first address et seq. of the H area 5A (Step S44). It is determined whether or not the data has been completely saved (Step S45). If No, the operation returns to Step S44. If Yes, the operation goes to Step S46. In Step S46, the data representing the first address of the H area 5A is set in the nonvolatile memory 12.

When the data is completely saved in the H area 5A, the power-supply controller 8 switches off the computer system in accordance with the instruction supplied from the BIOS 4 (Step S47). The contents of the main memory 2 and VRAM 7, which the system requires to resume the operating conditions it assumed before it was switched off, are saved in the H area 5A which consists of consecutive addresses, the first of which is represented by the address data stored in the nonvolatile memory 12.

Next, it is determined whether or not the power switch 9 is turned on (Step S48). If No, the operation returns to Step S47. If Yes, that is, if the user turns on the power switch 9, the BIOS 4 starts performing a resume operation in response to an SMI signal supplied from the power-supply controller 8. Then, it is determined whether the address data is stored in the nonvolatile memory 12 (Step S49). If Yes, the address data is read from the nonvolatile memory 12. Then, the BIOS 4 access the H area 5A consisting of consecutive addresses, the first of which is represented by the address data read from the nonvolatile memory 12. The data saved in the H area 5A is thereby restored in the main memory 2 and the VRAM 7 (Step S50). If No in Step S49, that is, the address data is not stored in the memory 12, the operation goes to Step S52, in which the BIOS 4 executes the boot mode, activating the computer system.

After the data saved in the H area 5A is restored in the main memory 2 and the VRAM 7, it is determined whether the data has been completely restored in the main memory 2 and the VRAM 7 (Step S51). If Yes, the hibernation-type resume operation completes.

In the third embodiment, the BIOS 4 alters the first address of the H area 5A every time the contents of the main memory 2 and VRAM 7 are written into the H area 5A during the hibernation-type resume operation. This means that the H area 5A (i.e., some consecutive addresses) is changed every time contents of the main memory 2 and VRAM 7 are saved in the HDD 5. Since the first address of the H area 5A is stored in the nonvolatile memory 12 incorporated in the computer system, the BIOS 4 can restore the contents of the main memory 2 and VRAM 7 in accordance with the first address when the computer system is switched on.

Assume that the HDD 5 storing the contents of the main memory 2 and VRAM 7 is removed from the computer system and set into another computer system. Even if the HDD 5 in the other system is accessed, the contents of the main memory 2 and VRAM 7 cannot be read from the HDD 5. This is because the other computer stores the address data required for accessing the H area 5A of the HDD 5. Namely, the data saved in the HDD 5, which is specific to the computer system, cannot be accessed in any other computer system. Thus, the data is reliably protected by virtue of the hibernation-type resume function, thereby solving the security problem.

In the third embodiment, the address data representing the first address of the H area 5A is stored in the nonvolatile memory 12 provided in the computer system. The first address is altered every time the contents of the main memory 2 and VRAM 7 are saved in the H area 5A. Instead, the first address may be changed by any other method, for example by using a random-number generator, making it impossible for the BIOS provided in the other computer system to access the H area 5A to read the data saved in the H area 5A.

Fourth Embodiment

The fourth embodiment of the invention is a personal computer of the type shown in FIG. 1, in which the power supply 10 is a rechargeable battery having a relatively small capacity. The fourth embodiment is characterized in two respects. First, the power remaining in the power supply 10 is monitored to determine whether or not the amount of power remaining in the power supply 10 has decreased to a minimal amount of power required to perform a hibernation-type resume operation. Second, either a hibernation-type resume function and a normal-type resume function can be selected and effected.

The normal-type resume function is to back up the main memory 2 by using the backup power-supply circuit 3 so as to save the contents of the main memory 2. The normal-type resume function requires more power than the hibernation-type resume function since the main memory 2 consumes power to keep its contents, but not so much power to initiate itself. By contrast, the hibernation-type resume function requires power to initiate itself because it cannot be initiated without driving the HDD 5, but requires no power to save the contents of the main memory 2.

Figure 8:
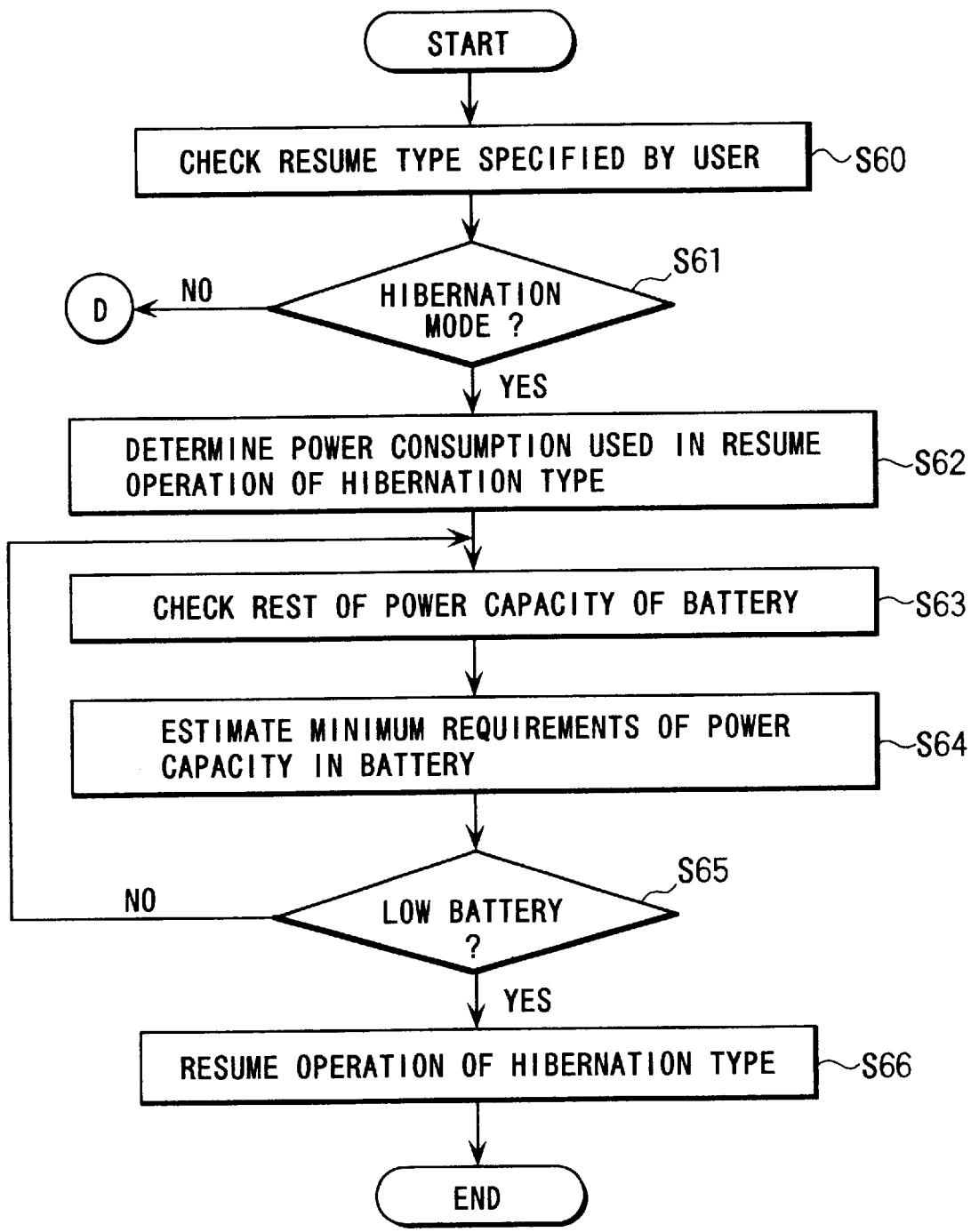
FIG. 8 is the first part of a flow chart explaining a hibernation-type resume operation and a normal-type resume operation are performed in the computer system according to a fourth embodiment of the present invention.
Figure 9:
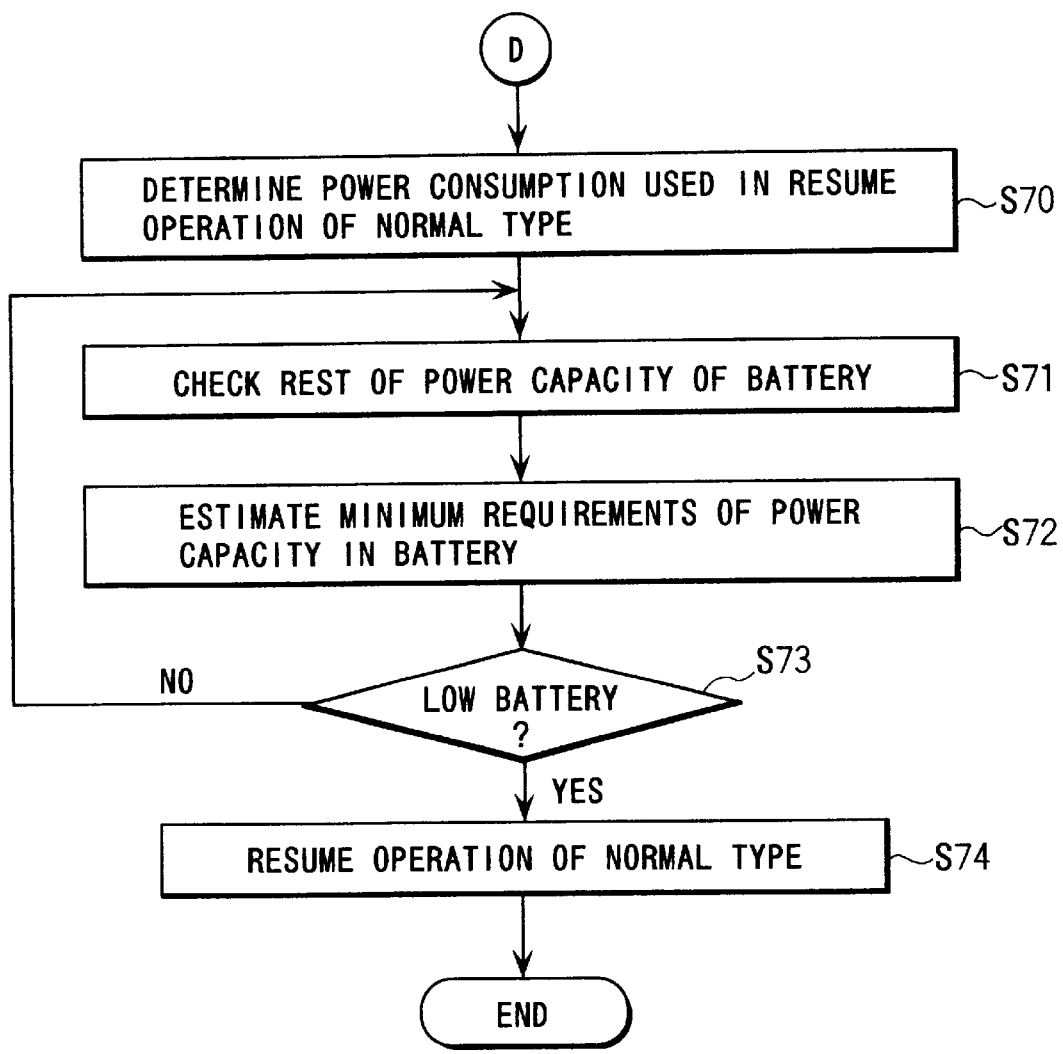
FIG. 9 is the second part of the flow chart explaining a hibernation-type resume operation and a normal-type resume operation are performed in the computer system according to the fourth embodiment.

The operation of the fourth embodiment will be explained, with reference to the flow chart of FIGS. 8 and 9.

First, the BIOS 4 identifies the type of the resume function which the user has selected by designating the corresponding icon displayed on the set-up screen of the display 6 (Step S60). It is determined whether the resume function selected is hibernation-type resume function (Step S61). If Yes, the BIOS 4 calculates an amount of power required to effect a hibernation-type resume operation (Step S62). Of the amount of power calculated, a greater part will be consumed to drive the HDD 5. The BIOS 4 further calculates the amount of power remaining at present in the power supply 10, from the rate at which the system is consuming power (Step S63). The present rate of power consumption is detected by the power-supply controller 8.

Next, the BIOS 4 estimates a minimal amount of power required to perform the hibernation-type resume operation, on the basis of the amount of power calculated in Step S62 and the amount of power calculated in Step S63 (Step S64). Further, the BIOS 4 determine whether the power remaining in the power supply 10 has decreased to the minimal amount (or low-battery value 1) estimated in Step S64 (Step S65). If No, the operation returns to Step S63. If Yes, the operation goes to Step S66. In Step S66, the BIOS 4 executes the hibernation-type resume operation which has been explained with reference to the flow chart of FIG. 3.

If No in Step S61, that is, if the normal-type resume function is selected, the operation goes to Step S70. In Step S70, the BIOS 4 calculates an amount of power required to accomplish a normal-type resume operation. Of the amount of power calculated in Step S70, a greater part will be consumed to save the contents of the main memory 2 and VRAM 7. Then, the BIOS 4 calculates the amount of power remaining at present in the power supply 10, from the rate at which the system is consuming power (Step S71).

Next, the BIOS 4 estimates a minimal amount of power required to perform the normal-type resume operation, on the basis of the amount of power calculated in Step S70 and the amount of power calculated in Step S71 (Step S72). The BIOS 4 determine whether the power remaining in the power supply 10 has decreased to the minimal amount (or low-battery value 2) estimated in Step S72 (Step S73). If No, the operation returns to Step S71. If Yes, the operation goes to Step S74. In Step S74, the BIOS 4 executes the normal-type resume operation which has been explained with reference to the flow chart of FIG. 3.

As mentioned above, the fourth embodiment is a personal computer. The power supply 10 is proportionally small and has a limited capacity. Once the power remaining in the power supply 10 becomes less than the low-battery value 1 or 2, a resume function can no longer be effected. The data the computer system requires to resume the operating conditions it assumed before the power switch 9 is turned off will inevitably erased. This would not happen in the fourth embodiment, because a resume function is automatically performed before the power remaining in the power supply 10 becomes less than either low-battery value.

More specifically, the amount of power remaining in the power supply 10 (i.e., rechargeable battery) is monitored. When the remaining power decreases to the low-battery value 1, the hibernation-type resume operation is performed automatically. The contents of the main memory 2 and VRAM 7 are reliably saved in the HDD 5. When the decreasing remaining power approaches the low-battery value 1, the power-supply controller 8 generates an alarm signal. In response to the alarm signal the BIOS 4 displays an alarm message on the screen of the display 6. The user can therefore learns that it is necessary to recharge the power supply 10 or replace it with a new one.

When the remaining power decreases to the low-battery level 2, the normal-type resume operation is effected automatically. The contents of memories (which ones) are saved in the main memory 2, and the computer system is set into non-operating state. The power in the power supply 10 is thereby saved.

Figure 11:
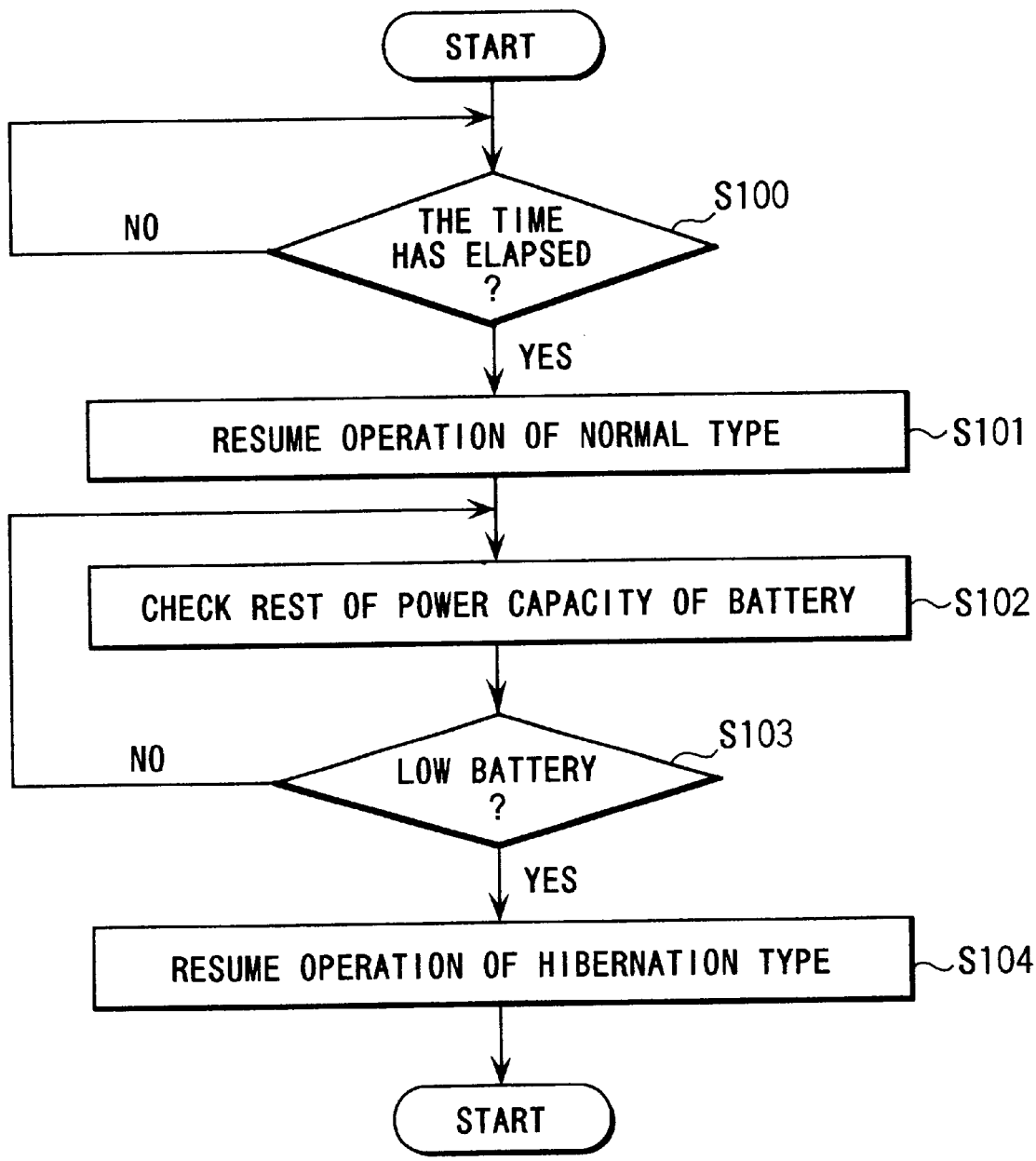
FIG. 11 is a flow chart explaining how a normal-type resume operation and a hibernation-type resume operation are performed in a modification of the fourth embodiment.

A modification of the fourth embodiment will be described, with reference to the flow chart of FIG. 11. The modified computer system is characterized in that a normal-type resume operation is carried out upon lapse of a predetermined time from the last key operation. To be more specific, it is determined whether the predetermined time has elapsed from the last key operation of the user (Step S100). If No, Step S100 is repeated. If Yes, the normal-type resume operation is performed (Step S101). Then, the power remaining in the power supply 10 is monitored (Step S102). It is determined whether the remaining power decreases to a prescribed low-battery value (Step S103). If No, Step S102 is repeated. If Yes, a hibernation-type resume operation is carried out (Step S104).

Fifth Embodiment

The fifth embodiment of the present invention is a computer system of the type shown in FIG. 1, in which the HDD 5 has an H area 5A as large as the total storage capacity of the memories provided, a hibernation-type resume function, and the H area 5A can be accessed at high speed to perform a hibernation-type resume function.

Generally, the total storage capacity of the memories are the sum of the storage capacity of the main memory 2 and the storage capacity of the VRAM 7. As shown in FIG. 1, the main memory 2 has an SM-RAM 2A and an expansion memory area 2B. (The SM-RAM 2A is provided to store the contents of the internal register of the CPU 1.) In the conventional hibernation-type resume function, the H area 5A of the HDD 5, as well as the user area 5B, is controlled by FAT scheme. The H area 5A consists of, in most cases, discontinuous empty storage areas provided on the hard disk and retrieved by the BIOS 4, excluding the user area 5B. The H area may not be so large as the total storage capacity of the memories provided when the computer system operates in specific conditions. Since the H area 5A consists of discontinuous empty areas, not consecutive ones, a considerably long time is required to access the H area 5A in order to restore all contents of the memories.

In the fifth embodiment, the H area 5A has as large as the total storage capacity of the memories provided and consists of consecutive empty areas, so as to be accessed at high speed.

Figure 10A:
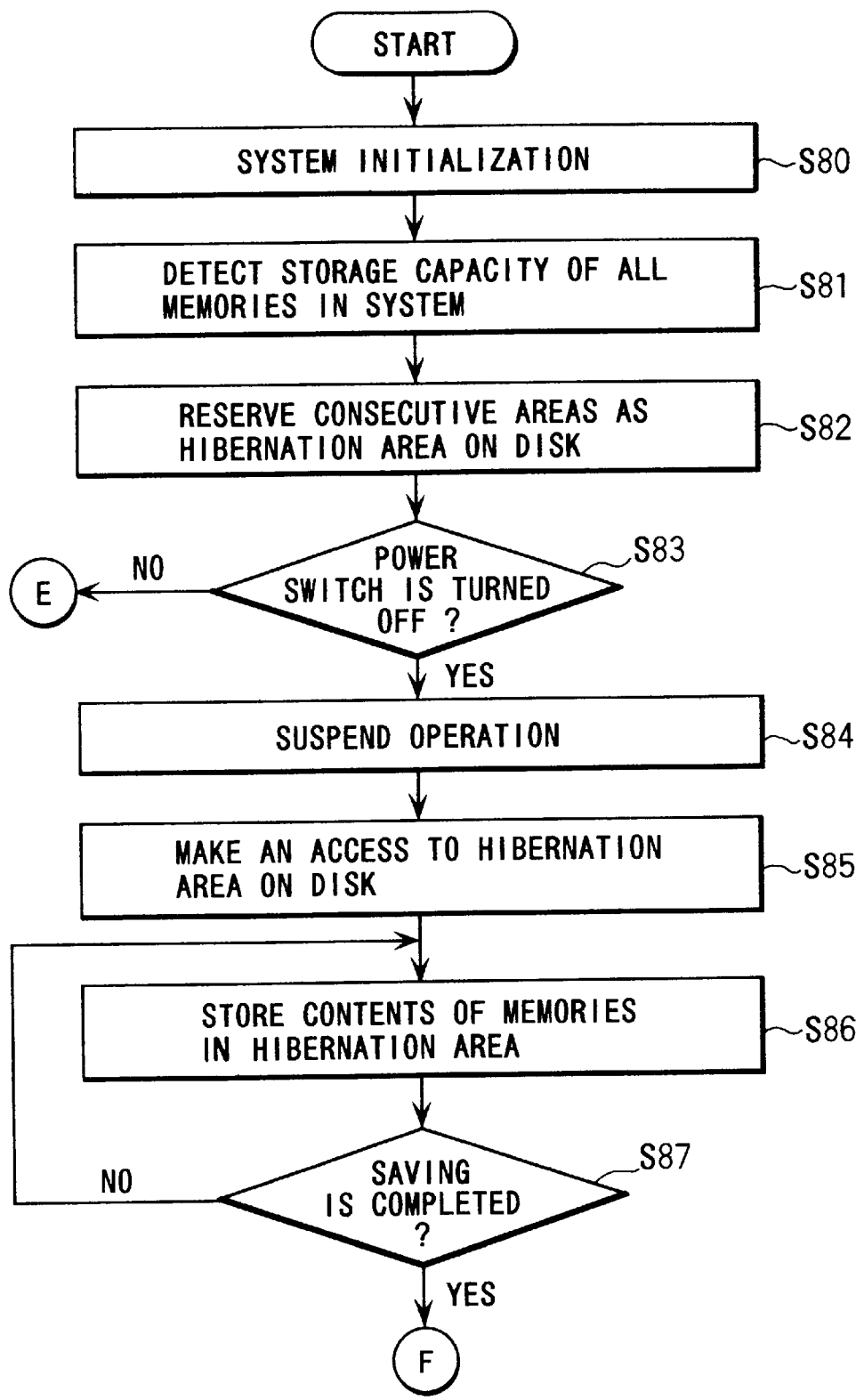
FIGS. 10A and 10B are flow charts explaining how a hibernation-type resume operation is performed in a computer system according to a fifth embodiment of the invention.
Figure 10B:
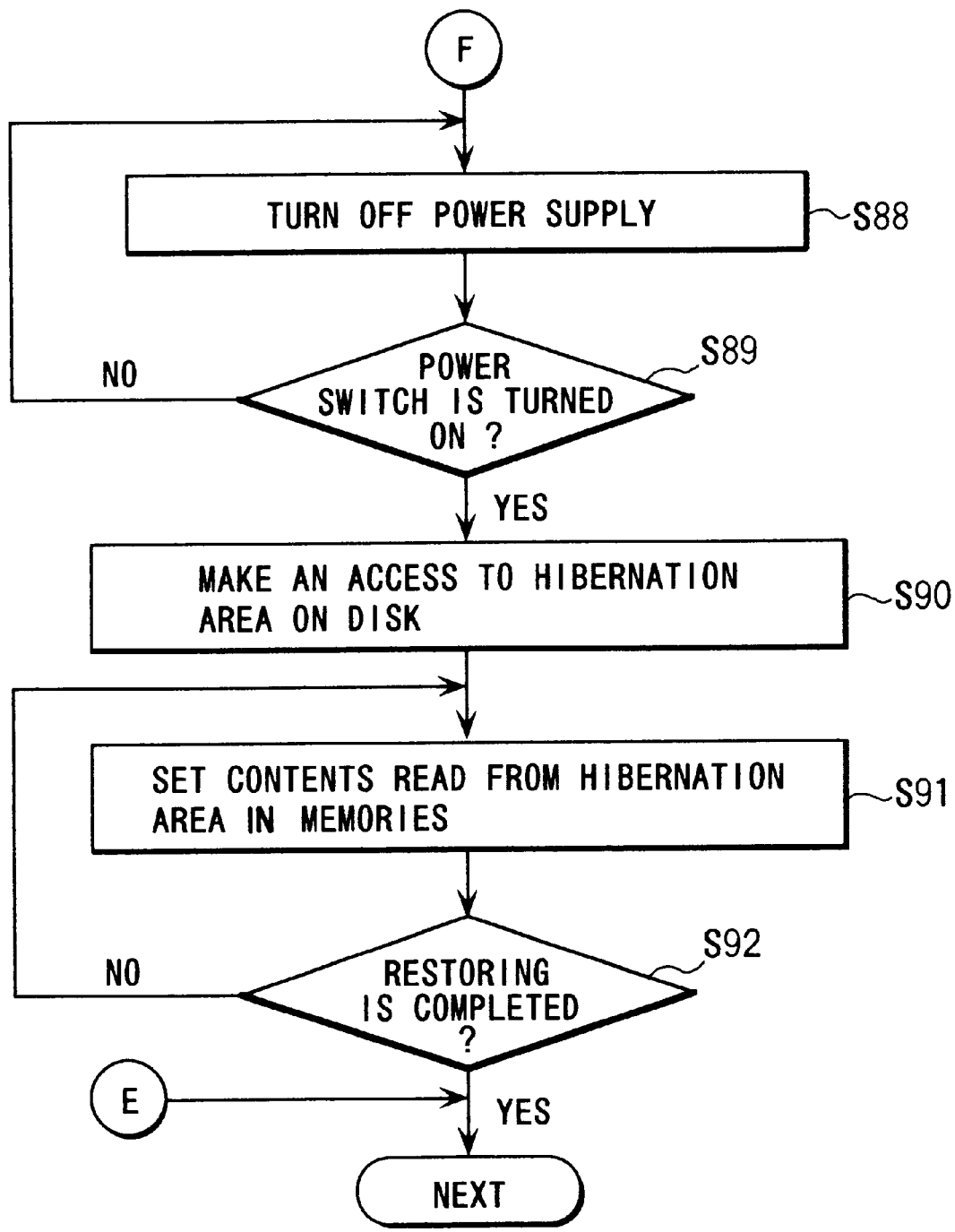

The operation of the fifth embodiment will be explained, with reference to the flow chart of FIGS. 10A and 10B.

The BIOS 4 initializes the computer system right after the user turned on the power switch 9 (Step S80). The total storage capacity of the memories provided in the system is detected (Step S81). The total storage capacity detected is, for example, 21 MB (=20 MB of the main memory 2 and 1 MB of the VRAM 7).

Next, the BIOS 4 reserves consecutive empty storage areas on the hard disk of the HDD 5, e.g., tens of inner tracks, which constitute the H area 5A as large as the total storage capacity of the main memory 2 and the VRAM 7 (Step S82). The BIOS 4 revises the parameter table for the HDD 5, excluding the H area 5A from the storage areas on the disk which the ordinary OS controls. Thus, the BIOS 4 controls the H area 5A as storage areas for resume operations only.

Thereafter, it is determined whether or not the user has turned off the power switch 9 (Step S83). If Yes, the BIOS 4 starts performing a suspend operation (Step S84). The BIOS 4 makes an access to the H area 5A of the HDD 5 (Step S85). The contents of the main memory 2 and VRAM 7 are thereby saved in the H area 5A (Step S86). Then it is determined whether or not the stored in the main memory 2 and VRAM 7 is completely saved in the H area 5A (Step S87). If No, Step S86 is repeated. If Yes, the power-supply controller 8 stops the power supply from the power supply 10 (Step S88).

Then it is determined whether or not the user has turned on the power switch 9 (Step S89). If No, the step S88 is repeated. If Yes, the BIOS 4 starts performing a resume operation in response to an SMI signal supplied from the power-supply controller 8. More precisely, the BIOS 4 accesses the H areas 5A of the HDD 5 (Step S90). The data saved in the H area 5A is thereby read and written back into the memory 2 and the VRAM 7 (Step S91). Thus, the contents of the main memory 2 and VRAM 7 is restored.

Further, it is determined whether or not the contents of the main memory 2 and VRAM 7 have been completely restored (Step S92). If No, Step S91 is repeated. If Yes, the operation of the computer system goes to the next step. The computer system thereby resumes the operating conditions it assumed immediately before the power switch 9 was turned off.

As indicated above, when the computer system is activated, the BIOS 4 reserves consecutive empty storage areas on the hard disk of the HDD 5, which constitute the H area 5A as large as the total storage capacity of the main memory 2 and the VRAM 7. This makes it possible to save all the data required later in the H area 5A by performing the hibernation-type resume operation. In addition, since the H area 5A consists of, for example, tens of consecutive inner tracks, it can be accessed at high speed, whereby the data can be restored within a relatively short time. The computer system can therefore quickly resume the operating conditions it assumed when it was switched off.

As has been described in detail, the computer system according to the first embodiment of the invention can perform a hibernation-type resume function works, whichever type is the file-control scheme of the OS installed in the computer system.

The computer system according to the second embodiment of this invention can restore the data it needs to resume the last operating conditions, within a short time after the system is switched on.

The computer system according to the third embodiment of the invention which can reliably protect the data saved in an HDD by a resume function, even after the HDD is removed from the system.

The computer system according to the fourth embodiment of the present invention incorporates a battery of a relatively small capacity and can yet perform a reliable resume function whenever necessary.

The computer system according to the fifth embodiment of the invention has an HDD having a storage area for saving data by a resume function, and can access that storage area at high speed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system, comprising:
    a power supply for supplying power to various devices of the system;
    a volatile memory for storing data associated with an operation of the system in a state where power is supplied thereto;
    a nonvolatile storage for storing said data in a state where said power is not supplied thereto;
    means for directing suspension or resumption of an operation of the system; and
    means for first saving data associated with the operation of the system in the nonvolatile storage when the directing means instructs the suspension of the operation of the system, while continuing to supply power to the volatile memory for a predetermined period of time to allow the volatile memory to maintain the data associated with the operation of the system, and for subsequently suspending the system,
    said system being resumed on the basis of the data stored in the volatile memory, when the resumption of the operation of the system is directed within said predetermined period of time.

2. The system according to claim 1, wherein said saving means stops power supply to said volatile memory when the resumption of the operation of the system is not directed during the predetermined period of time.

3. A computer system having resume function which executes a resume operation when a power supply is switched off or on, said system comprising:
    a power supply;
    a volatile memory for storing resume data representing operating conditions which the system assumes when the power supply is switched off;
    nonvolatile storage means having a replaceable recording medium for saving the resume data stored in said volatile memory even after the power supply is switched off;
    memory means for storing address data representing an address at which the resume data is saved in said recording medium,
    set means for setting the address data in said memory means in accordance with predetermined conditions when the power supply is switched off;
    suspend means for saving the resume data in a storage area provided on said recording medium, which has been designated by the address data set in said memory means, when the power supply is switched off;
    means for identifying the storage area of said recording medium on the basis of the address data set in said memory means when said power supply is switched on;
    means for restoring the resume data from the identified storage area when the power supply is switched on, thereby to cause the system to resume the operating conditions which the system assumed before said power supply was switched off; and
    means for generating time data representing the time at which said power supply was switched off, and said set means sets the address data in said memory means in accordance with the time data.

4. A computer system having resume function, comprising:
    a power supply;
    resume means for performing a resume operation to save resume data representing operating conditions of the system in a nonvolatile memory means when said power supply is switched off, and to restore the resume data from the nonvolatile memory means when the power supply is switched on, whereby the system resumes the operating conditions which the system assumed before the power supply was switched off;

reserving means for providing a resume storage area in said nonvolatile memory means so as to save the resume data when said resume means performs the resume operation; and means for determining a total storage capacity of a volatile memory for storing the resume data representing operation conditions of the system; said resume storage area being as large as the total storage capacity determined by said determining means, wherein the resume storage area provided in said nonvolatile memory means is accessed, thereby to save the resume data, when said resume means performs the resume operation.

5. A computer system, comprising:

disk storage device used as an external storage device to the system and having a data storage area for storing various data items while a power supply remains off;

reserving means for providing a resume storage area in said disk storage device for saving resume data when the resume operation is performed, said resume data representing operating conditions of the system;

resume means for performing a resume operation to access the resume storage area, thereby to save the resume data in the resume storage area, when said power supply is switched off, and to access the resume storage area; thereby to restore the resume data from the disk storage device, when the power supply is switched on, whereby the system resumes the operating conditions which the system assumed before the power supply was switched off; and means for determining a total storage capacity of a volatile memory for storing the resume data representing operating conditions of the system, said resume storage area being as large as the total storage capacity determined by said determining means and which consists of consecutive storage area provided in said disk storage device.

6. The computer system according to claim 5, further comprising:

a battery used as a power supply for the system;

estimating means for estimating a minimal amount of power which said resume means needs to perform a resume operation, on the basis of a minimal power required to drive said disk storage device and rate at which the system is consuming power at present; and check means for monitoring an amount of power remaining in the battery as long as the system is operating, wherein said resume means accesses the resume storage area of said disk storage device, thereby saving the resume data in the resume storage area, when the amount of power remaining in said battery, which is detected by said check means decreases to the minimal amount estimated by said estimating means.

7. A method of performing a resume operation in a computer system when a power supply is switched off or on, said method comprising the steps of:

supplying power to a memory holding resume data representing operating conditions of the system, for a specified period after the power supply is switched off;

reading the resume data from the memory when the power supply is switched on, to cause the system to resume the operating conditions;

saving the resume data in a resume storage area provided in a disk storage device used as an external storage device to the system;

switching off the power supply to said memory upon lapse of said specified period;

accessing the resume storage area when said power supply is switched on; and restoring the resume data, to cause the system to resume the operating conditions which the system assumed before said power supply was switched off.

8. A method of performing a resume operation in a computer system when a power supply is switched off or on, said method comprising the steps of:

generating time data representing the time at which the power supply was switched off providing nonvolatile storage means having a replaceable recording medium for saving resume data stored in a volatile memory, which represents operating conditions which the system assumed before the power supply was switched off;

saving the resume data in a storage area provided on said replaceable recording medium and designated by address data set in accordance with the time data;

storing the time data and the address data in nonvolatile memory means incorporated in the system;

identifying the storage area of said recording medium on the basis of the address data stored in said nonvolatile memory means when said power supply is switched on; and restoring the resume data from the identified storage area when the power supply is switched on, thereby to cause the system to resume the operating conditions which the system assumed before said power supply was switched off.

9. A computer system having resume function, comprising:

a power supply;

resume means for performing a resume operation to save resume data representing operating conditions of the system in a nonvolatile memory means when said power supply is switched off, and to restore the resume data from the nonvolatile memory means when the power supply is switched on, whereby the system resumes the operating conditions which the system assumed before the power supply was switched off;

reserving means for providing a resume storage area in said nonvolatile memory means, which is large enough to save the resume data when said resume means performs the resume operation; and a BIOS for performing the resume operation and in which the resume storage area is controlled by only the BIOS, wherein the resume storage area provided in said nonvolatile memory means is accessed, thereby to save the resume data, when said resume means performs the resume operation, and wherein said nonvolatile memory means has a data storage area for storing various data items other than said resume data, and the resume storage area is prevented from being accessed as long as the system performs operations other than the resume operation.

10. A computer system, comprising:

an external storage detachably connected to a main body of the computer system and including a storage area for storing data associated with an operation of the main body of the computer system;

means for saving the data in the storage area, an address used when the data is saved being stored in a nonvolatile memory of the system in accordance with a predetermined setting condition, said predetermined setting condition being time information used when the data is saved; and means for reading data from the storage area on the basis of the address saved in the nonvolatile memory in response to a request for reading the data out from the storage area.

11. A computer system comprising:

a power supply for supplying power to various devices of the system;

a volatile memory for storing data in a state where the power is supplied thereto;

a nonvolatile storage memory including a storage area used for storing the data;

means for determining storage capacity of the volatile storage memory; and means for changing the storage capacity of the storage area of the nonvolatile storage memory in accordance with the storage capacity of the volatile memory determined by determining means.

12. The system according to claim 11, further comprising reserving means for providing the storage area of the nonvolatile memory corresponding to a total storage capacity of memories provided in advance in the system, in successive storage areas in a hard disk drive of the system, when the system is started.

13. The system according to claim 11, further comprising:

reserving means for providing the storage area in said nonvolatile memory means, to save resume data when the system performs a resume operation.

14. The system according to claim 12, wherein the storage area of said nonvolatile storage memory is an area provided in a disk of a hard disk drive which is an external storage device.

15. A method of controlling operation of a computer system including a power supply, a volatile memory, and a nonvolatile memory, the method comprising the steps of:

storing data associated with an operation of the system in the nonvolatile memory, when the operation of the system is suspended;

supplying power from the power supply to the volatile memory, which stores the data for a predetermined period of time from suspension of the operation of the system;

resuming the operation of the system on the basis of the data stored in the volatile memory, when resumption of the operation of the system is requested within the predetermined period of time; and stopping supply of the power to the volatile memory after lapse of a predetermined period of time.

16. The method according to claim 15, wherein the volatile memory is a main memory of the system, and which further comprises a step of restoring the data stored in the volatile memory, data stored in a register provided in a CPU, and data registered in a hardware register, on the basis of the data stored in the nonvolatile storage, when the power supply is turned on.

17. The method according to claim 15, wherein the volatile memory is a main memory of the system, and which further comprises a step of supplying power to only the volatile memory by use of a backup power until said predetermined period of time elapses after the data associated with the operation of the system is saved in the nonvolatile memory.

18. A method of controlling operation of a computer system including a power supply, a volatile memory, and a nonvolatile memory, comprising the steps of:

supplying power from the power supply to the volatile memory, which stores data, for a predetermined period of time, and resuming the operation of the system on the basis of data stored in the volatile memory when resumption of the operation of the system is requested within the predetermined period of time;

stopping supply of the power to the volatile memory after lapse of the predetermined period of time; and resuming the operation of the system on the basis of the data stored in the volatile memory when the resumption of the operation of the system is requested within the lapse of the predetermined period of time.

19. A computer system comprising:

a power supply for supplying power to various devices of the system;

a volatile memory for storing data associated with an operation of the system in a state where power is supplied thereto;

a nonvolatile storage for storing said data in a state where said power is not supplied thereto;

means for directing suspension or resumption of an operation of the system; and means for saving data associated with the operation of the system in the nonvolatile storage when the directing means instructs the suspension of the operation of the system, while continuing to supply power to the volatile memory for a predetermined period of time to allow the volatile memory to maintain the data associated with the operation of the system, said system being resume on the basis of the data stored in the volatile memory, when the resumption of operation of the system is directed within said predetermined period of time.

20. The system according to claim 19, wherein said directing means operates in response to turning on/off of power switching means.

21. The system according to claim 19, wherein the predetermined period of time is designated on a setup screen of the system.

22. The system according to claim 19, wherein said volatile memory stores data in a video RAM, with power supplied thereto.

23. The system according to claim 19, wherein the volatile memory is a main memory of the system, and which further comprises means for restoring, when the power supply is turned on, the data stored in the volatile memory, data stored in a resister provided in a CPU, and data registered in a hardware resister, on the basis of the data stored in the nonvolatile storage.

24. The system according to claim 19, wherein the volatile memory is a main memory of the system, and which further comprises means for supplying power to the volatile memory by use of a backup power until said predetermined period of time elapses after the data associated with the operation of the system is saved in the nonvolatile memory.

25. The system according to claim 19, wherein the volatile memory includes an SM-RAM for storing the data associated with the operation of the system, and which further comprises means for supplying power to the SM-RAM by using a backup power, when supply of power is stopped, and the system enters a non-operating state.

26. The system according to claim 25, further comprising means for making the system enter a non-operating state by stopping supply of a clock signal to a CPU, with a backup power turned on, and by stopping operations of a hard disk drive and a display.

27. The system according to claim 19, wherein said saving means stops power supply to said volatile memory when the resumption of the operation of the system is not directed during the predetermined period of time.

28. A computer system comprising:

a power supply for supplying power to various devices of the system;

a volatile memory for storing data in a state where the power is supplied thereto;

a nonvolatile storage memory including a storage area used fir storing the data;

means for determining storage capacity of the volatile storage memory; and means for changing the storage capacity of the storage area of the nonvolatile storage memory in accordance with the storage capacity of the volatile memory determined by determining means, which further comprises a main memory and a video memory, and wherein the storage capacity of the volatile memory is an addition of a capacity of the main memory and a capacity of the video RAM.

29. A computer system comprising:

a power supply for supplying power to various devices of the system;

a volatile memory for storing data in a state where the power is supplied thereto;

a nonvolatile storage memory including a storage area used fir storing the data;

means for determining storage capacity of the volatile storage memory; and means for changing the storage capacity of the storage area of the nonvolatile storage memory in accordance with the storage capacity of the volatile memory determined by determining means, wherein the storage area of the nonvolatile memory corresponds to an entire storage capacity of successive tracks arranged on an inner peripheral side of a disk in a hard disk drive which is an external storage device.

30. A computer system comprising:

a power supply for supplying power to various devices of the system;

a volatile memory for storing data in a state where the power is supplied thereto;

a nonvolatile storage memory including a storage area used fir storing the data;

means for determining storage capacity of the volatile storage memory; and means for changing the storage capacity of the storage area of the nonvolatile storage memory in accordance with the storage capacity of the volatile memory determined by determining means, which further comprises an operating system for managing the storage area, and wherein the storage area of the nonvolatile storage memory corresponds to a storage capacity of an area other than the storage areas managed by the operating system in a hard disk drive which is an external storage device of the system.

31. A computer system comprising:

a power supply for supplying power to various devices of the system;

a volatile memory for storing data in a state where the power is supplied thereto;

a nonvolatile storage memory including a storage area used fir storing the data;

means for determining storage capacity of the volatile storage memory; and means for changing the storage capacity of the storage area of the nonvolatile storage memory in accordance with the storage capacity of the volatile memory determined by determining means, which further comprises an operating system for managing the storage area, and wherein the storage area of the nonvolatile storage memory is a storage area provided in an area other than the storage area managed by the operating system.

32. A computer system comprising:

a power supply for supplying power to various devices of the system;

a volatile memory for storing data in a state where the power is supplied thereto;

a nonvolatile storage memory including a storage area used fir storing the data;

means for determining storage capacity of the volatile storage memory; and means for changing the storage capacity of the storage area of the nonvolatile storage memory in accordance with the storage capacity of the volatile memory determined by determining means, further comprising:

means for write-protecting the storage area of said nonvolatile storage means from access by a user of the system.

33. A computer system comprising:

an external storage connected to a main body of the computer system and including a storage area for saving data associated with an operation of the computer system;

means for storing an address used when the data is saved in a nonvolatile memory of the system in accordance with a predetermined setting condition, said predetermined setting condition being time information used when the data is saved; and means for reading data from the storage area on the basis of the address saved in the nonvolatile memory in response to a request for reading the data out from the storage area.

34. The system according to claim 33, further comprising means for checking time information for use in storing the data in the storage area, and storing the time information in the nonvolatile memory, and for storing the address used when the data is saved, in the nonvolatile memory after the data is stored in the storage area.

35. The system according to claim 33, further comprising means for changing a start address of the storage area in accordance with the predetermined setting condition each time the data associated with an operation of the computer system is saved in the external storage.

36. The system according to claim 33, wherein the external storage is a hard disk drive, and a cylinder address of the hard disk drive is used as a start address of the storage area.

37. The system according to claim 33, further comprising means for producing the start address by use of random numbers.

38. A computer system having resume function, comprising:

a power supply;

resume means for performing a resume operation to save resume data representing operating conditions of the system in a nonvolatile memory means when said power supply is switched off, and to restore the resume data from the nonvolatile memory means when the power supply is switched on, whereby the system resumes the operating conditions which the system assumed before the power supply was switched off;

reserving means for providing a resume storage area in said nonvolatile memory means, to save the resume data when said resume means performs the resume operation; and wherein the resume storage area provided in said nonvolatile memory means is accessed, thereby to save the resume data, when said resume means performs the resume operation, and wherein said nonvolatile memory means has a data storage area for storing various data items other than said resume data, and the resume storage area is prevented from being accessed as long as the system performs operations other than the resume operation.

39. The system according to claim 38, which further comprises a BIOS, and wherein the storage area of said nonvolatile storage memory is access-managed by the BIOS.

40. A method of performing a resume operation in a computer system when a power supply is switched off or on, said method comprising the steps of:

supplying power to a memory holding resume data representing operating conditions of the system, for a specified period after the power supply is switched off;

reading the resume data from the memory while the power is supplied to the memory, for causing the system to resume the operating conditions;

saving the resume data in a resume storage area provided in a disk storage device used as an external storage device to the system;

switching off the power supply to said memory upon lapse of said specified period;

accessing the resume storage area when said power supply is switched on; and restoring the resume data, to cause the system to resume the operating conditions which the system assumed before said power supply was switched off.

* * * * *